United States Patent
Tarradell

(10) Patent No.: US 9,369,822 B2
(45) Date of Patent: Jun. 14, 2016

(54) REPORTING POWER DISRUPTIONS OF MACHINE-TO-MACHINE DEVICES

(75) Inventor: Marta Martinez Tarradell, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 133 days.

(21) Appl. No.: 13/995,119

(22) PCT Filed: Feb. 1, 2012

(86) PCT No.: PCT/US2012/023533
§ 371 (c)(1),
(2), (4) Date: Jun. 17, 2013

(87) PCT Pub. No.: WO2013/009355
PCT Pub. Date: Jan. 17, 2013

(65) Prior Publication Data
US 2013/0266000 A1    Oct. 10, 2013

Related U.S. Application Data

(60) Provisional application No. 61/507,030, filed on Jul. 12, 2011.

(51) Int. Cl.
| | |
|---|---|
| *H04W 4/00* | (2009.01) |
| *H04W 56/00* | (2009.01) |
| *H04W 72/04* | (2009.01) |
| *H04L 5/00* | (2006.01) |
| *H04L 29/08* | (2006.01) |

(52) U.S. Cl.
CPC ............. *H04W 4/005* (2013.01); *H04L 5/0039* (2013.01); *H04L 67/12* (2013.01); *H04W 56/004* (2013.01); *H04W 72/048* (2013.01); *H04W 72/0446* (2013.01)

(58) Field of Classification Search
CPC ........................................................ H04W 4/005
USPC .......................... 370/230, 242, 335; 455/450
See application file for complete search history.

(56) References Cited

U.S. PATENT DOCUMENTS 7,533,215 B2 * 5/2009 Faber ............................ 711/103
2011/0314325 A1 * 12/2011 Nakayama et al. ............ 714/4.2

(Continued)

OTHER PUBLICATIONS

International Preliminary Report on Patentablity for PCT/US2012/023522 dated Jan. 23, 2014, 7 pages.

(Continued)

*Primary Examiner* — Parth Patel
(74) *Attorney, Agent, or Firm* — Schwabe, Williamson & Wyatt, P.C.

(57) ABSTRACT

Embodiments of the present disclosure describe device, methods, computer-readable media and system configurations for communication of notifications of unexpected power disruptions of machine-to-machine ("M2M") devices among network entities. In various embodiments, an M2M device may be configured to detect an unexpected power disruption and notify a wireless network access node of the detected unexpected power disruption. In various embodiments a wireless network access node may be configured to receive a notification of an unexpected power disruption of an M2M device and communicate, to a plurality of M2M devices, a notification of the unexpected power disruption. Other embodiments may be described and/or claimed.

21 Claims, 5 Drawing Sheets

(56) References Cited

U.S. PATENT DOCUMENTS

| | | | |
|---|---|---|---|
| 2012/0106329 A1* | 5/2012 | Ahmed et al. | 370/230 |
| 2012/0178464 A1* | 7/2012 | Li | H04W 72/02 455/450 |
| 2012/0226930 A1* | 9/2012 | Colban et al. | 713/340 |
| 2013/0310016 A1* | 11/2013 | Park | H04W 28/18 455/418 |
| 2013/0315074 A1* | 11/2013 | Kim et al. | 370/242 |
| 2014/0031063 A1* | 1/2014 | Park | H04W 4/005 455/456.1 |
| 2014/0092801 A1* | 4/2014 | Kim | H04L 12/1877 370/312 |
| 2014/0119201 A1* | 5/2014 | Kim et al. | 370/242 |
| 2014/0293967 A1* | 10/2014 | Kim et al. | 370/335 |

OTHER PUBLICATIONS

Marta Martinez, et al. "MS abnormal or involuntary power down reports in advanced air interface", IEEE 802.16 Broadband Wireless Access Working Group, IEEE C802.16p 11_0196, Jul. 11, 2011.

International Search Report and Written Opinion mailed Jul. 25, 2012 from International Application No. PCT/US2012/023533.

Chen et al., "Handling Smart Meter Power Outage," IEEE 802.16 Broadband Wireless Access Working Group, IEEE C802.16p-11/0145r1, Jul. 20, 2011, 12 pages.

Kim et al., "Involuntary power outage report by M2M device in connected mode," IEEE 802.16 Broadband Wireless Access Working Group, IEEE 802.16p-11/0176, Jul. 10, 2011, Sections 2 and 4, 6 pages.

Tarradell et al., "MS abnormal or involuntary power down reports in advanced air interface," IEEE 802.16 Broadband Wireless Access Working Group, IEEE C802.16p-11_0196r2, Jul. 19, 2011, Sections 2-3, 4 pages.

Tarradell et al., "BS abnormal or involuntary power down reports in advanced air interface," IEEE 802.16 Broadband Wireless Access Working Group, IEEE C802.16p-11_0197, Jul. 19, 2011, Sections 2-3, 3 pages.

Office Action issued Feb. 10, 2015 from Korean Application No. 2014-7000772.

Martinez Tarradell et al., "MS abnormal or involuntary power down reports in advanced air interface," IEEE 802.16 Broadband Wireless Access Working Group, IEEE C802.16p-11_0196, Jul. 10, 2011, 2 pages.

Office Action issued Apr. 1, 2016 from Chinese Patent Application No. 201280034451.6, 8 pages.

Examination Report issued Mar. 15, 2016 from British Patent Application No. GB1400316.4, 3 pages.

Martinez Tarradell et al., "MS abnormal or involuntary power down reports in advanced air interface," IEEE 802.16 Broadband Wireless Access Working Group, IEEE C802.16p-11_0196r1, Jul. 10, 2011, 4 pages.

* cited by examiner

REPORTING POWER DISRUPTIONS OF MACHINE-TO-MACHINE DEVICES

CROSS REFERENCE TO RELATED APPLICATIONS

The present application is a national phase entry under 35 U.S.C. §371 of International Application No. PCT/US2012/023533, filed Feb. 1, 2012, entitled "REPORTING POWER DISRUPTIONS OF MACHINE-TO-MACHINE DEVICES", which designates the United States of America, and which claims priority to U.S. Provisional Patent Application No. 61/507,030, filed Jul. 12, 2011, the entire contents and disclosures of which are hereby incorporated by reference in their entireties.

FIELD

Embodiments of the present invention relate generally to the field of communications, and more particularly, to machine-to-machine communications.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Machine-to-machine ("M2M") wireless machines or devices (hereafter referred to as "devices") may communicate primarily or exclusively with other machines or devices, with little or no human intervention. Examples of M2M devices may include wireless weather sensors, assembly line sensors, meters to track vehicles of a fleet, and so forth. In many cases these devices may connect to a wireless network and communicate, e.g., over a wide area network such as the Internet, with a network server. M2M devices may be used with the IEEE 802.16 standard, IEEE Std. 802.16-2009, published May 29, 2009 ("WiMAX"), as well as in Third Generation ("3G") networks. In parlance of the 3GPP Long Term Evolution ("LTE") Release 10 (March 2011) (the "LTE Standard"), M2M communications may alternatively be referred to as "machine type communications" ("MTC").

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
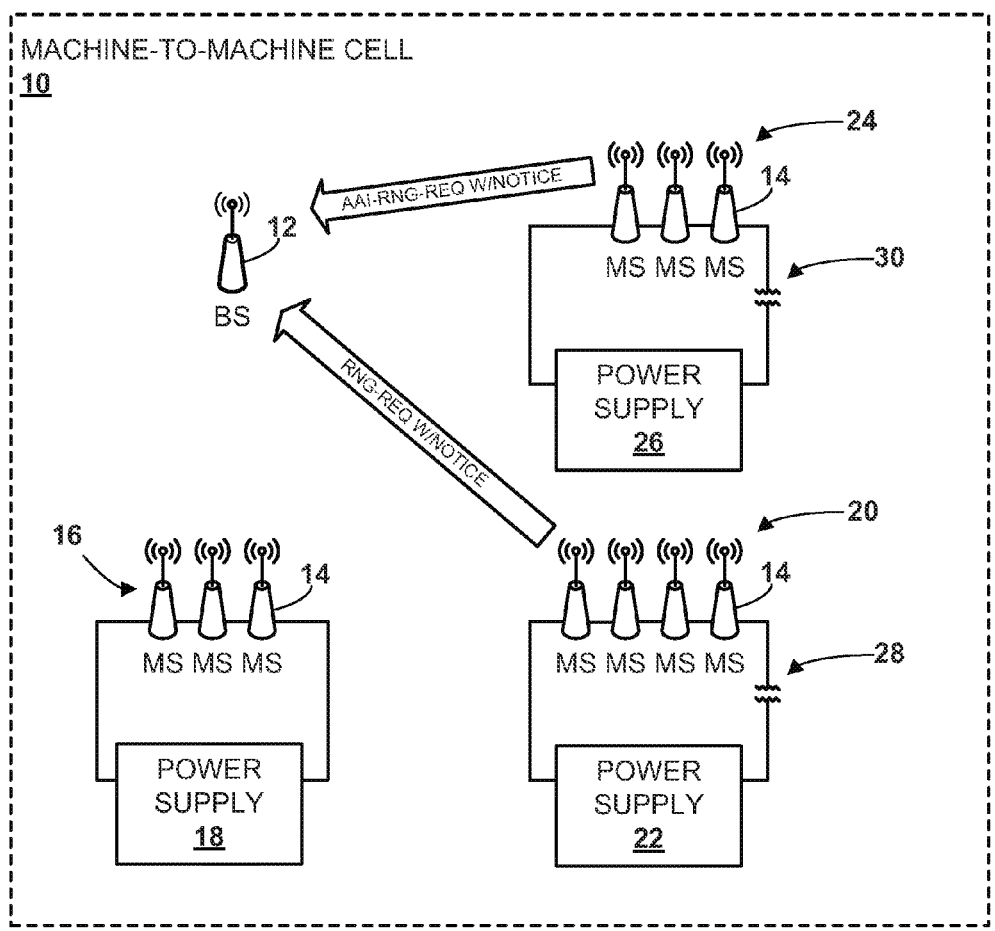
FIG. 1 schematically illustrates an example machine-to-machine cell in which components implement disclose methods, in accordance with various embodiments.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be implemented. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit ("ASIC"), an electronic circuit, a processor (shared, dedicated, or group) and/or memory (shared, dedicated, or group) that execute one or more software or firmware programs, a combinational logic circuit, and/or other suitable components that provide the described functionality. As used herein, "computer-implemented method" may refer to any method executed by one or more processors, a computer system having one or more processors, a mobile device such as a smart phone (which may include one or more processors), a tablet, laptop computer, a set-top box, a gaming console, and so forth.

There may be a large number of machine-to-machine ("M2M") devices in a cell. In some cases, the M2M devices may be powered by one or more power grids or other power sources. If a supply of power is disrupted, any number of M2M devices in the cell, from one to hundreds or even thousands, may suddenly lose power. In such a scenario, an M2M device may have only a short amount of time, e.g., until charge in an internal capacitor runs out, to notify pertinent network entities (e.g., a base station) about the power disruption. However, the amount of time to carry out such an operation may be brief, e.g., 150~250 ms. Accordingly, M2M devices may be configured to communicate notifications of abnormal or unintended power downs promptly, before they lose power.

An example cell 10 is shown in FIG. 1. Cell 10 may include at least one access node ("WNAN") 12. While shown here in the form of base station ("BS"), in various embodiments, a WNAN may be other types of access nodes, such as an evolved Node B ("eNB"). One or more M2M devices 14, shown herein the form of mobile subscribers ("MS"), may join cell 10 by establishing a wireless connection with WNAN 12. In various embodiments, M2M devices 14 may alternatively be user equipment ("UE") devices configured for machine-type communication ("MTC"), or other types of M2M wireless devices. While not shown in FIG. 1, in various embodiments, cell 10 may include any number of other non-M2M wireless devices, such as cellular telephones.

A first group 16 of M2M devices 14 may be powered by a first power supply 18. A second group 20 of M2M devices 14 may be powered by a second power supply 22. A third group 24 of M2M devices 14 may be powered by a third power supply 26. In various embodiments, a power supply such as first power supply 18, second power supply 22 and third power supply 26 may be a connection to an electrical grid through which electricity is received from, e.g., a local or regional power plant. In other embodiments, a power supply may be a local supply of power, such as one or more solar panels, one or more windmills, and so forth. Additionally or alternatively, in various embodiments, a power supply may be a fuel-powered generator, or even a battery. For purposes of this disclosure, the type of power supply is not important, and disclosed techniques may perform equally well no matter the type of power supply.

M2M devices powered by various types of power supplies may experience abnormal, involuntary, or, more generally, unexpected power disruptions, for a variety of reasons. A connection between one or more M2M devices and a power supply may be interrupted. For instance, a power line may be downed in a storm. Additionally or alternatively, a power supply itself may be disrupted or damaged. For instance, a rain storm may deprive a solar panel of sufficient sunlight to provide power, or a generator may run out of fuel.

Regardless of whether a path to a power supply is disrupted or the power supply itself is disrupted, M2M devices dependent on the power supply may experience an unexpected power disruption. Examples of this are seen in FIG. 1. A disturbance 28 between second power supply 22 and second group 20 of M2M devices 14 may cause second group 20 to experience an unexpected power disruption. Another disturbance 30 between third power supply 26 and third group 24 of M2M devices 14 may cause M2M devices 14 in third group 24 to experience an unexpected power disruption.

M2M devices 14, such as those in second group 20 and third group 24, may be configured to detect unexpected power disruptions and notify WNAN 12 of the detected unexpected power disruptions. An example of this is shown in the arrows of FIG. 1. WNAN 12 in turn may be configured to receive the one or more notifications of the unexpected power disruptions experienced by M2M devices 14 in second group 20 and/or third group 24, and take appropriate action.

M2M devices of a cell may be in various states of operation, such as connected, idle, sleep, and so forth, when an unexpected power disruption occurs. To ensure that the M2M devices are able to notify WNANs of the disruption before they shut down (e.g., after a capacitor loses its charge), M2M devices may be configured to notify WNANs of power disruptions during procedures normally used to establish or reestablish connections with WNANs.

For example, in various embodiments, M2M devices may be configured to communicate notification of an unexpected power disruption to a WNAN as part of an initial ranging procedure. This may be done in various ways. For instance, an M2M device may be configured to include an indication of the unexpected power disruption in a ranging purpose indication field.

In embodiments implemented in accordance with the IEEE Standard for Air Interface for Broadband Wireless Access Systems Amendment: Enhancements to Support Machine-to-Machine Applications ("802.16p"), this indication may be included in an RNG-REQ message sent to the WNAN. For instance, a reserved bit of the ranging purpose indication field, such as bit five, may be set to "1" to indicate an abnormal or involuntary power down. An example of this is seen in FIG. 1, from second group 20 of M2M devices 14 to WNAN 12. If an M2M device is in a normal mode, with uplink bandwidth already allocated and available, then the M2M device may use the available bandwidth to send the RNG-REQ message with the indication of the unexpected power disruption. However, if the M2M device is in normal mode but does not have available uplink bandwidth, then the M2M device may request bandwidth, and upon receiving bandwidth allocation, the M2M may send the RNG-REQ message with the indication of the unexpected power disruption.

In embodiments implemented in accordance with the IEEE Standard for WirelessMAN-Advanced Air Interface for Broadband Wireless Access System: Enhancements to Support Machine-to-Machine Applications ("802.16.1b"), an abnormal or involuntary power down indication may be in the form of a predetermined value of the ranging purpose indication field of the AAI-RNG-REQ message. In some cases, the predetermined value that indicates an abnormal or involuntary power down may be 0b1110. An example of this is seen in FIG. 1, from third group 24 of M2M devices 14 to WNAN 12. In various embodiments, if an M2M device is in a connected state with a WNAN, with uplink bandwidth already allocated and available, then the M2M device may use the available bandwidth to send this AAI-RNG-REQ message with the indication of the unexpected power disruption. If the M2M device is in connected state but does not have available uplink bandwidth, then the M2M device may first request bandwidth, and upon receiving bandwidth, it may send the AAI-RNG-REQ message with the indication of the unexpected power disruption.

Figure 2:
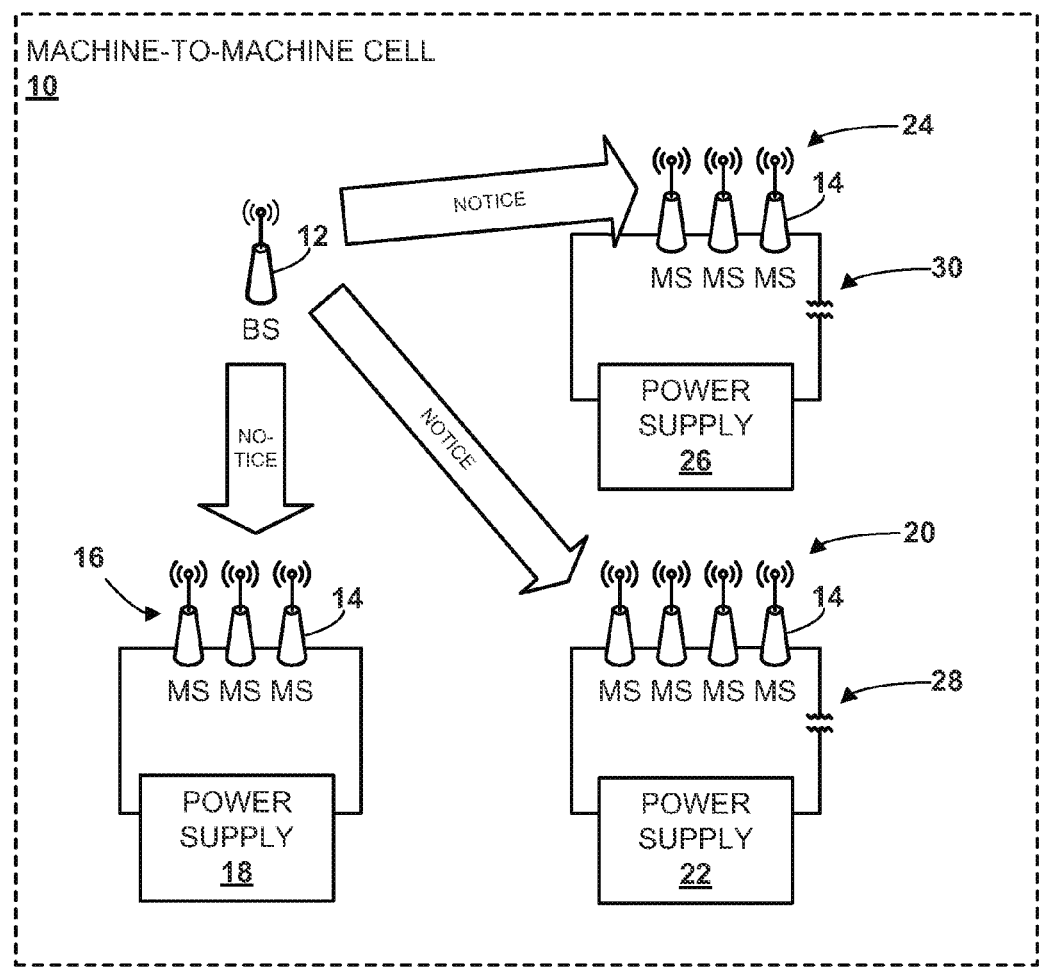
FIG. 2 schematically depicts the example machine-to-machine cell of FIG. 1, at a later stage, in accordance with various embodiments.

WNAN 12 may take various actions in response to receiving notification of an unexpected power disruption experienced by one or more M2M devices. For example, in FIG. 2, WNAN 12 may be configured to transmit a notification of the one or more unexpected power disruption to a plurality of M2M devices 14, e.g., using a broadcast message. This broadcast message may be sent to multiple (or even all) M2M devices 14 in cell 10. The broadcast notification transmitted by the WNAN 12 to the plurality of M2M devices 14 of cell 10 may cause the plurality of M2M devices receiving the broadcast message to refrain from transmitting, to WNAN 12, their own notifications of the unexpected power disruption. This may have the advantages of limiting network traffic and resource consumption by devices such as WNAN 12 and M2M devices 14.

Figure 3:
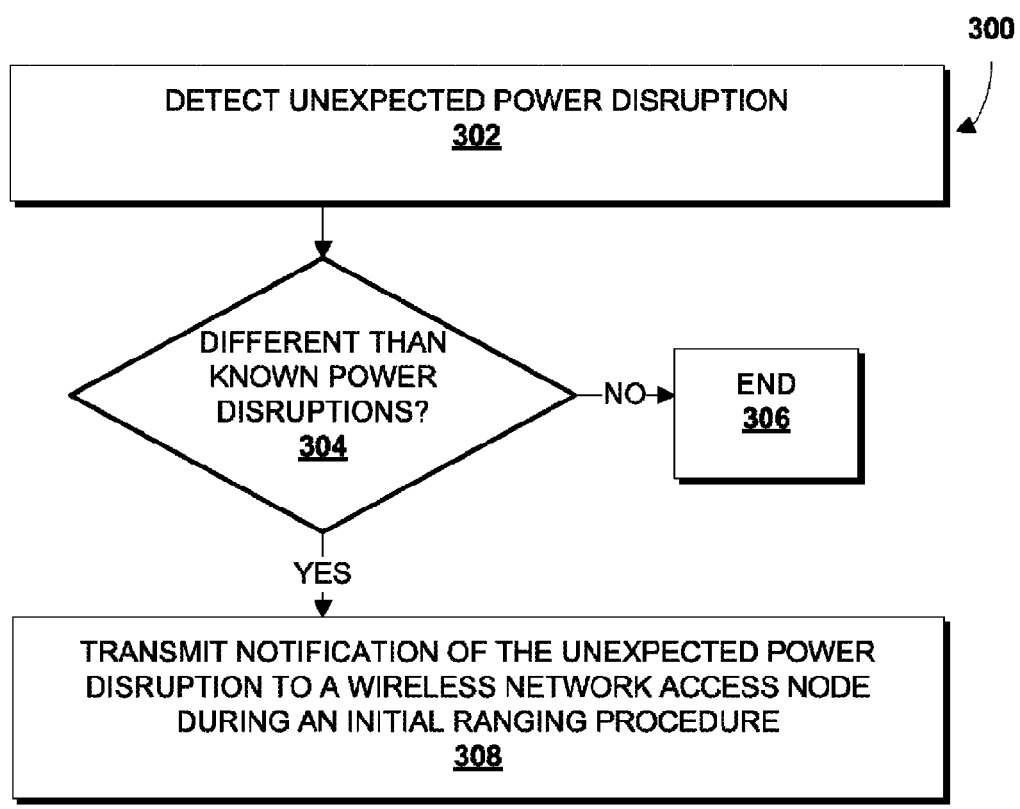
FIG. 3 schematically depicts an example method that may be performed by a machine-to-machine device, in accordance with various embodiments.

An example method 300 that may be implemented by an M2M device is depicted in FIG. 3. At block 302, an M2M device may detect an unexpected power disruption. For instance, in FIG. 1, an M2M device 14 in second group 20 of M2M devices may detect disturbance 28 when the M2M device 14 suddenly and unexpectedly stops receiving power from second power supply 22.

At decision block 304, the M2M device may determine whether the detected unexpected power disruption is different than any known unexpected power disruptions. If the answer is no, the M2M device may have already been notified of the power disruption by a WNAN. In such case, the method may end at block 306. However, if the detected power disruption is different from any known unexpected power disruptions, then at block 308, the M2M device may transmit, to a WNAN such as WNAN 12 in FIG. 1, a notification of the detected unexpected power disruption. In this manner, the M2M device does not unnecessarily send a notification of the unexpected power disruption to a WNAN that is already aware of the power disruption.

In some embodiments, the M2M device may transmit the notification at block 308 during an initial ranging procedure. In various embodiments, the transmitting may include transmitting the notification of the detected unintended power disruption in a ranging purpose indication field. For example, the ranging purpose indication field may be part of an RNG-REQ message sent by M2M device 14 in second group 20 in FIG. 1 to WNAN 12, e.g., bit five of the ranging purpose indication field of the RNG-REQ message. As another example, the ranging purpose indication field may be part of an AAI-RNG-REQ message sent by M2M device 14 of third group 24 to WNAN 12, e.g., a predetermined value of the ranging purpose indication field (e.g., 0b1110).

Figure 4:
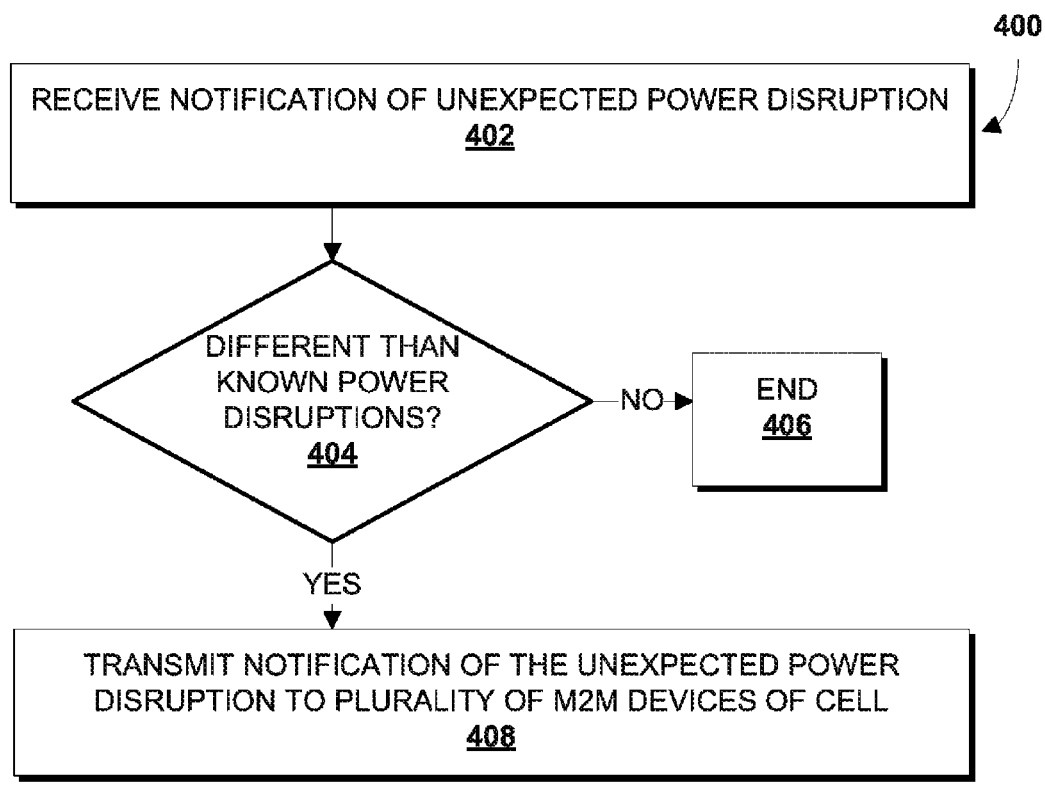
FIG. 4 schematically depicts an example method that may be performed by a wireless network access node such as a base station, in accordance with various embodiments.

An example method 400 that may be implemented by a WNAN such as a base station or eNB is depicted in FIG. 4. At block 402, the WNAN may receive, from an M2M device, a notification of an unexpected power disruption experienced by the M2M device. At block 404, the WNAN may determine whether the unexpected power disruption is different than known disruptions of which the WNAN has already been notified, particularly disruptions of which the WNAN has already broadcast notifications. If the answer is no, then at block 406, the method may end. However, if the answer is yes, then at block 408, the WNAN may transmit, to a plurality of M2M devices in a cell, a notification of the unexpected power disruption, as shown in FIG. 1. In various embodiments, the transmitted notification may instruct the plurality of M2M devices receiving it to refrain from transmitting, to the WNAN, notifications of the unexpected power disruption. As described previously, this may reduce network traffic and conserve computing resources.

In various embodiments, at block 402, the notification of the unexpected power disruption of the M2M device 14 may be received during an initial ranging procedure of the M2M device 14. As discussed previously, in various embodiments, an indication of the unexpected power disruption may be received in a ranging purpose indication field of an RNG-REQ or AAI-RNG-REQ message received from the M2M device 14.

Figure 5:
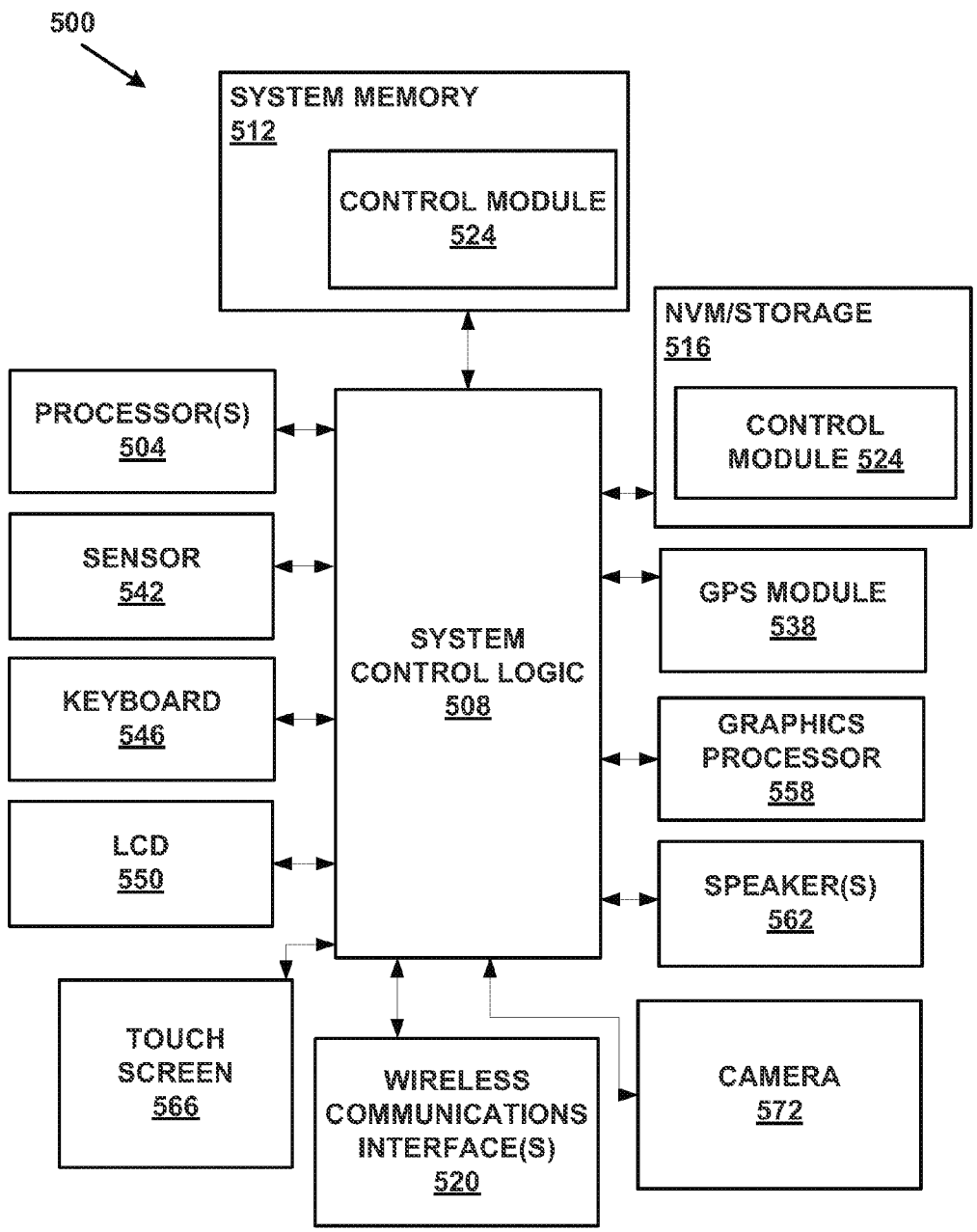
FIG. 5 schematically depicts an example system, in accordance with various embodiments.

The techniques and apparatuses described herein may be implemented into a system using suitable hardware and/or software to configure as desired. FIG. 5 illustrates, for one embodiment, an example wireless communication device in the form of a system 500 comprising one or more processor(s) 504, system control logic 508 coupled to at least one of the processor(s) 504, system memory 512 coupled to system control logic 508, non-volatile memory (NVM)/storage 516 coupled to system control logic 508, and one or more wireless communications interface(s) 520 coupled to system control logic 508.

System control logic 508 for one embodiment may include any suitable interface controllers to provide for any suitable interface to at least one of the processor(s) 504 and/or to any suitable device or component in communication with system control logic 508.

System control logic 508 for one embodiment may include one or more memory controller(s) to provide an interface to system memory 512. System memory 512 may be used to load and store data and/or instructions, for example, for system 500. System memory 512 for one embodiment may include any suitable volatile memory, such as suitable dynamic random access memory ("DRAM"), for example.

System control logic 508 for one embodiment may include one or more input/output ("I/O") controller(s) to provide an interface to NVM/storage 516 and wireless communications interface(s) 520.

NVM/storage 516 may be used to store data and/or instructions, for example. NVM/storage 516 may include any suitable non-volatile memory, such as flash memory, for example, and/or may include any suitable non-volatile storage device(s), such as one or more hard disk drive(s) ("HDD(s)"), one or more solid-state drive(s), one or more compact disc ("CD") drive(s), and/or one or more digital versatile disc ("DVD") drive(s) for example.

The NVM/storage 516 may include a storage resource physically part of a device on which the system 500 is installed or it may be accessible by, but not necessarily a part of, the device. For example, the NVM/storage 516 may be accessed over a network via the wireless communications interface(s) 520.

System memory 512 and NVM/storage 516 may include, in particular, temporal and persistent copies of a control module, respectively. The control module 524 may include instructions that when executed by at least one of the processor(s) 504 result in the system 500 transmitting or receiving notifications of unexpected power disruptions, as described above. In some embodiments, the control module 524 may additionally/alternatively be located in the system control logic 508.

Wireless communications interface(s) 520 may provide an interface for system 500 to communicate over one or more network(s) and/or with any other suitable device. Wireless communications interface(s) 520 may include any suitable hardware and/or firmware, such as a wireless network adapter. The wireless communications interface(s) 520 may use one or more antenna(s).

For one embodiment, at least one of the processor(s) 504 may be packaged together with logic for one or more controller(s) of system control logic 508. For one embodiment, at least one of the processor(s) 504 may be packaged together with logic for one or more controllers of system control logic 508 to form a System in Package ("SiP"). For one embodiment, at least one of the processor(s) 504 may be integrated on the same die with logic for one or more controller(s) of system control logic 508. For one embodiment, at least one of the processor(s) 504 may be integrated on the same die with logic for one or more controller(s) of system control logic 508 to form a System on Chip ("SoC").

The system 500 may be a desktop or laptop computer, a WNAN such as a base station or an eNB, an M2M device, a mobile telephone, a smart phone, a tablet, a set-top box, a game console, or any other device adapted to transmit or receive a wireless communication signal. In various embodiments, system 500 may have more or less components, and/or different architectures. For example, in FIG. 5, system 500 includes a global positioning system ("GPS") module 538, a sensor 542, a keyboard 546, a liquid crystal display ("LCD") screen 550 determine a location of system 500, a graphics processor 558, speakers 562, a touch screen 566 (which in some cases may be the same as LCD display 550), and a camera 572 that may be operated by the processor to capture images for storage in NVM/storage 516. The sensor 542 may sense any number of conditions, such as weather conditions, temperature, assembly line conditions, and so forth, and report the sensed conditions to an application server, periodically, by request, or whenever the condition meets a particular criterion (e.g., a temperature threshold).

Various combinations and embodiments are contemplated herein. For example, a machine-to-machine device may include a processor, memory coupled to the processor and a control module to be operated by the processor. In various embodiments, the machine-to-machine device may further include a wireless communication interface. In various embodiments, the control module may be configured to detect an unexpected power disruption and notify a wireless network access node of the detected unexpected power disruption.

In various embodiments, the control module may be configured to communicate an indication of the unexpected power disruption to the wireless network access node during an initial ranging procedure. In various embodiments, the control module may be configured to include the indication in a ranging purpose indication field. In various embodiments, the control module may be configured to include the indication in an RNG-REQ message sent by the machine-to-machine device to the wireless network access node, e.g., in bit five of a ranging purpose indication field of the RNG-REQ message.

In various embodiments, the control module may be configured to include an indication of the unexpected power disruption in an AAI-RNG-REQ message sent by the machine-to-machine device to the wireless network access node. In various embodiments, the indication may be a predetermined value in a ranging purpose indication field of the AAI-RNG-REQ message, e.g., Obi 110.

In various embodiments, the machine-to-machine device may be configured to receive, from a wireless network access node, a notification of a second unexpected power disruption in one or more machine-to-machine devices of a plurality of machine-to-machine devices. In various embodiments, the control module may be configured to notify the wireless network access node of the detected unexpected power disruption where it is determined that the detected unexpected power disruption is different than the second unexpected power disruption.

In various embodiments, a wireless network access node such as a base station may include a processor and memory operably coupled to the processor. In various embodiments, the base station may further comprise a wireless communication interface. The base station may further include a control module to be operated by the processor. In various embodiments, the control module of the base station may be configured to receive, from a first machine-to-machine device, a notification of an unexpected power disruption of the first machine-to-machine device. In various embodiments, the control module may be configured to communicate, to a plurality of machine-to-machine devices, a notification of the unexpected power disruption.

In various embodiments, the first machine-to-machine device may be a member of the plurality of machine-to-machine devices. In various embodiments, the plurality of machine-to-machine devices may be part of a cell.

In various embodiments, the control module of the base station may be configured to receive the notification of the unexpected power disruption of the first machine-to-machine device during an initial ranging procedure of the first machine-to-machine device. In various embodiments, the control module may be configured to receive the indication in a ranging purpose indication field of a message received from the first machine-to-machine device. In various embodiments, the control module may be configured to receive an indication of the unexpected power disruption in an RNG-REQ message or in an AAI-RNG-REQ message received from the first machine-to-machine device. In various embodiments, the control module may be configured to receive the indication in bit five of a ranging purpose indication field of the RNG-REQ message. Features of the various embodiments described above may be implemented as methods or processes.

Although certain embodiments have been illustrated and described herein for purposes of description, a wide variety of alternate and/or equivalent embodiments or implementations calculated to achieve the same purposes may be substituted for the embodiments shown and described. This application is intended to cover any adaptations or variations of the embodiments discussed herein. Therefore, it is manifestly intended that embodiments described herein be limited only by the claims and the equivalents thereof.

What is claimed is:

1. One or more non-transitory computer-readable media having instructions that when executed by one or more processors causes a machine-to-machine device to:
   detect an unexpected power disruption of the machine-to-machine device;
   determine that the detected unexpected power disruption is different from any unintended power disruptions of which the machine-to-machine device has already been notified; and
   transmit a wireless network access node, a predetermined value in a ranging purpose indication field, a notification of the detected unintended power disruption based on the determination that that the detected unexpected power disruption is different from any unintended power disruptions of which the machine-to-machine device has already been notified,
   wherein the predetermined value includes a value of 1 for the fifth bit position (bit five) of the ranging purpose indication field when the notification is a RNG-REQ (ranging request) message, or
   wherein the predetermined value is a value of 0b1110 in the ranging purpose indication field when the notification is an AAI-RNG-REQ (Advanced Air Interface ranging request) message.

2. The one or more non-transitory computer-readable media of claim 1, wherein the instructions, when executed by the one or more processors, causes the machine-to-machine device to receive, from the wireless network access node, a notification of another unexpected power disruption in one or more machine-to-machine devices of a plurality of machine-to-machine devices.

3. The one or more non-transitory computer-readable media of claim 2, wherein the instructions, when executed by the one or more processors, causes the machine-to-machine device to:
   notify the wireless network access node of the detected unexpected power disruption where it is determined that the detected unexpected power disruption is different than the other unexpected power disruption; and
   refrain from notifying the wireless network access node of the detected unexpected power disruption where it is determined that the detected unexpected power disruption and the other unexpected power disruption are the same.

4. The one or more non-transitory computer-readable media of claim 1, wherein reception of the notification of the unexpected power disruption of the machine-to-machine device is during an initial ranging procedure of the machine-to-machine device.

5. The one or more non-transitory computer-readable media of claim 1, wherein the machine-to-machine device is a member of a group of machine-to-machine devices.

6. The one or more non-transitory computer-readable media of claim 5, wherein the group of machine-to-machine devices are part of a cell.

7. The one or more non-transitory computer-readable media of claim 1, wherein transmission of the notification of the unexpected power disruption of the machine-to-machine device is during an initial ranging procedure of the machine-to-machine device.

8. A machine-to-machine device, comprising:
a processor;
memory coupled to the processor; and
a control module to be operated by the processor, the control module is to detect an unexpected power disruption and, during an initial ranging procedure, notify a wireless network access node of the detected unexpected power disruption,
wherein to notify the wireless network access node of the detected unexpected power disruption, the control module is to include a predetermined value in a ranging purpose indication field to indicate the unexpected power disruption,
wherein the predetermined value includes a value of 1 for the fifth bit position (bit five) of the ranging purpose indication field when the notification is a RNG-REQ message, or
wherein the predetermined value is a value of 0b1110 in the ranging purpose indication field when the notification is an AAI-RNG-REQ message.

9. The machine-to-machine device of claim 8, further comprising a wireless communication interface.

10. The machine-to-machine device of claim 8, wherein the control module is further to receive, from the wireless network access node, a notification of another unexpected power disruption in one or more machine-to-machine devices of a plurality of machine-to-machine devices.

11. The machine-to-machine device of claim 10, wherein the control module is further to:
notify the wireless network access node of the detected unexpected power disruption where it is determined that the detected unexpected power disruption is different than the other unexpected power disruption; and
refrain from notifying the wireless network access node of the detected unexpected power disruption where it is determined that the detected unexpected power disruption and the other unexpected power disruption are the same.

12. A wireless network access node, comprising:
a processor;
memory operably coupled to the processor; and
a control module to be operated by the processor and to:
receive, from a first machine-to-machine device, a notification of an unexpected power disruption of the first machine-to-machine device, wherein the notification is included in a ranging purpose indication field, wherein the ranging purpose indication field is part of an RNG-REQ message or an AAI-RNG-REQ message received from the first machine-to-machine device, and wherein, when the ranging purpose indication field is part of the RNG-REQ message, the predetermined value includes a value of 1 in the fifth bit position (bit five) of the ranging purpose indication field of the RNG-REQ message, or when the ranging purpose indication field is part of the AAI-RNG-REQ message, the predetermined value is a value of 0b1110 for the ranging purpose indication field of the AAI-RNG-REQ message;
determine that the unexpected power disruption of the first machine-to-machine device is different than known power disruptions of which the wireless network access node has already been notified; and
communicate, to a plurality of machine-to-machine devices, a notification of the unexpected power disruption based on the determination that the unexpected power disruption is different than the known power disruptions.

13. The wireless network access node of claim 12, wherein the first machine-to-machine device is a member of the plurality of machine-to-machine devices.

14. The wireless network access node of claim 12, further comprising a wireless communication interface.

15. The wireless network access node of claim 12, wherein the plurality of machine-to-machine devices are part of a cell.

16. The wireless network access node of claim 12, wherein the control module is to receive the notification of the unexpected power disruption of the first machine-to-machine device during an initial ranging procedure of the first machine-to-machine device.

17. One or more non-transitory computer-readable media having instructions that, when executed by one or more processors, causes a wireless network access node to:
receive, from a machine-to-machine device, a notification of an unexpected power disruption experienced by the machine-to-machine device, wherein the notification is included a ranging purpose indication field, wherein the ranging purpose indication field is part of an RNG-REQ message or an AAI-RNG-REQ, and wherein when the ranging purpose indication field is part of the RNG-REQ message, the predetermined value is in the fifth bit position (bit five) of the ranging purpose indication field of the RNG-REQ message and the predetermined value is 1, or when the ranging purpose indication field is part of an AAI-RNG-REQ message, the predetermined value is 01110;
determine that the unexpected power disruption is different from known power disruptions; and
transmit, based on the determination that the unexpected power disruption is different from known power disruptions, to a plurality of machine-to-machine devices, a notification of the unexpected power disruption to instruct the plurality of machine-to-machine devices to refrain from transmitting, to the wireless network access node, notifications of the unexpected power disruption.

18. The one or more non-transitory computer-readable media of claim 17, wherein the receiving includes receiving the notification of the unexpected power disruption of the machine-to-machine device during an initial ranging procedure of the machine-to-machine device.

19. The one or more non-transitory computer-readable media of claim 18, wherein the ranging purpose indication field is to have a predetermined value to indicate the unexpected power disruption.

20. The one or more non-transitory computer-readable media of claim 17, wherein the machine-to-machine device is a member of a group of machine-to-machine devices.

21. The one or more non-transitory computer-readable media of claim 20, wherein the group of machine-to-machine devices are part of a cell.

* * * * *